(12) United States Patent
Thiele et al.

(10) Patent No.: US 8,752,332 B2
(45) Date of Patent: Jun. 17, 2014

(54) VEHICLE SLIDE DOOR PINCH SENSOR ASSEMBLY

(75) Inventors: Steven R. Thiele, Marysville, OH (US);
Kozo Kusumoto, Dublin, OH (US);
Jeremy B. Josefovsky, Piqua, OH (US)

(73) Assignee: Honda Motor Co., Ltd., Tokyo (JP)

( * ) Notice: Subject to any disclaimer, the term of this patent is extended or adjusted under 35 U.S.C. 154(b) by 236 days.

(21) Appl. No.: 13/091,539

(22) Filed: Apr. 21, 2011

(65) Prior Publication Data

US 2012/0267914 A1 Oct. 25, 2012

(51) Int. Cl.
*B60J 5/06* (2006.01)
*E05F 15/06* (2006.01)

(52) U.S. Cl.
USPC .............................................. 49/27; 49/490.1

(58) Field of Classification Search
USPC .......... 49/26, 27, 28, 490.1, 498.1; 200/61.43
See application file for complete search history.

(56) References Cited

U.S. PATENT DOCUMENTS

| | | | | |
|---|---|---|---|---|
| 6,081,088 A * | 6/2000 | Ishihara et al. | ............... | 318/466 |
| 6,339,305 B1 * | 1/2002 | Ishihara et al. | ............... | 318/445 |
| 6,851,222 B2 * | 2/2005 | Albiero | ............................ | 49/27 |
| 6,883,847 B2 * | 4/2005 | Willett | ......................... | 296/1.08 |
| 6,896,268 B2 * | 5/2005 | Hofmann et al. | ............. | 277/317 |
| 6,896,954 B2 * | 5/2005 | Omori et al. | ............... | 428/304.4 |
| 6,955,079 B2 * | 10/2005 | Ishihara et al. | ............. | 73/114.01 |
| 7,000,352 B2 * | 2/2006 | Ishihara et al. | ................... | 49/28 |
| 7,055,885 B2 * | 6/2006 | Ishihara et al. | ............. | 296/146.4 |
| 7,116,117 B2 * | 10/2006 | Nakano et al. | ................ | 324/688 |
| 7,504,943 B2 * | 3/2009 | Takeuchi et al. | ........... | 340/545.1 |
| 7,534,957 B2 * | 5/2009 | Yamaura et al. | ................ | 174/36 |
| 7,712,256 B2 * | 5/2010 | Kato et al. | ......................... | 49/26 |
| 7,893,831 B2 * | 2/2011 | Hoshina et al. | ............. | 340/545.1 |
| 7,958,672 B2 * | 6/2011 | Ishihara | ............................ | 49/26 |
| 8,159,231 B2 * | 4/2012 | Sakamaki | ..................... | 324/663 |
| 8,191,311 B2 * | 6/2012 | Sakamaki et al. | ................ | 49/27 |
| 8,205,391 B2 * | 6/2012 | Aritake et al. | ............... | 49/498.1 |
| 8,397,581 B2 * | 3/2013 | Ruby et al. | ....................... | 73/768 |
| 2002/0144466 A1 * | 10/2002 | Gopalan et al. | ............. | 49/475.1 |
| 2003/0056600 A1 * | 3/2003 | Shank et al. | .................... | 73/780 |
| 2004/0107640 A1 * | 6/2004 | Ishihara et al. | .................... | 49/27 |
| 2006/0096383 A1 * | 5/2006 | Yamamoto et al. | ............. | 73/773 |
| 2006/0191203 A1 * | 8/2006 | Ueda et al. | .......................... | 49/27 |
| 2006/0272217 A1 * | 12/2006 | Gopalan | ....................... | 49/490.1 |
| 2007/0266635 A1 * | 11/2007 | Sugiura et al. | ..................... | 49/27 |

(Continued)

FOREIGN PATENT DOCUMENTS

| | | |
|---|---|---|
| EP | 0856425 | 8/1998 |
| JP | 2003220837 | 8/2003 |
| JP | 2005-075085 | 3/2005 |
| KR | 20070035242 | 3/2007 |

*Primary Examiner* — Katherine Mitchell
*Assistant Examiner* — Justin Rephann
(74) *Attorney, Agent, or Firm* — Rankin, Hill & Clark LLP (57) ABSTRACT

A vehicle assembly comprises a motorized door movable between an open position and a closed position and a pressure-activated sensor assembly. The sensor assembly includes a switch component, a flexible component and an engagement component. The switch component actuates upon pressure contact with an associated obstructing object. The flexible component substantially surrounds the switch component. The engagement component is connected with the door and extends from the flexible component towards the door. An exterior garnish member is connected to the door and laterally offset from the flexible component. The garnish member is configured to at least partially inhibit contact of the flexible component by an occupant during occupant ingress and egress of the vehicle.

19 Claims, 5 Drawing Sheets

(56) References Cited

U.S. PATENT DOCUMENTS

| | | | |
|---|---|---|---|
| 2008/0000166 A1* | 1/2008 | Whitehead | 49/490.1 |
| 2008/0148646 A1* | 6/2008 | Nozaki et al. | 49/490.1 |
| 2009/0100755 A1* | 4/2009 | Ishihara | 49/31 |
| 2009/0120007 A1* | 5/2009 | Aritake et al. | 49/490.1 |
| 2009/0178343 A1 | 7/2009 | Zimmer et al. | |
| 2009/0218978 A1 | 9/2009 | Kato et al. | |
| 2009/0267786 A1* | 10/2009 | Sakamaki et al. | 340/686.6 |
| 2009/0289469 A1 | 11/2009 | Thiele | |
| 2011/0047879 A1* | 3/2011 | Shimizu et al. | 49/358 |

\* cited by examiner

VEHICLE SLIDE DOOR PINCH SENSOR ASSEMBLY

BACKGROUND

Exemplary embodiments herein generally relate to safety sensors installed in vehicles, and more specifically, to pressure-activated sensors for preventing an automatic door or other moveable structure in a passenger vehicle from forcibly closing in the event the opening becomes obstructed by, for example, the arms, legs, or fingers of a passenger.

Pressure-activated or pressure-sensitive sensors are used in passenger vehicles and in other applications for preventing an automatic powered door from forcibly closing over an obstruction, such as the arms, legs, or fingers of a passenger. In automotive applications, such sensors (typically referred to as "pinch sensors") are required for customer protection when vehicles include a motorized or automatic slide door. The pinch sensor detects whether an obstruction bumps into a front edge of the slide door for the purpose of stopping or reversing an operation of the slide door while closing.

Figure 5:
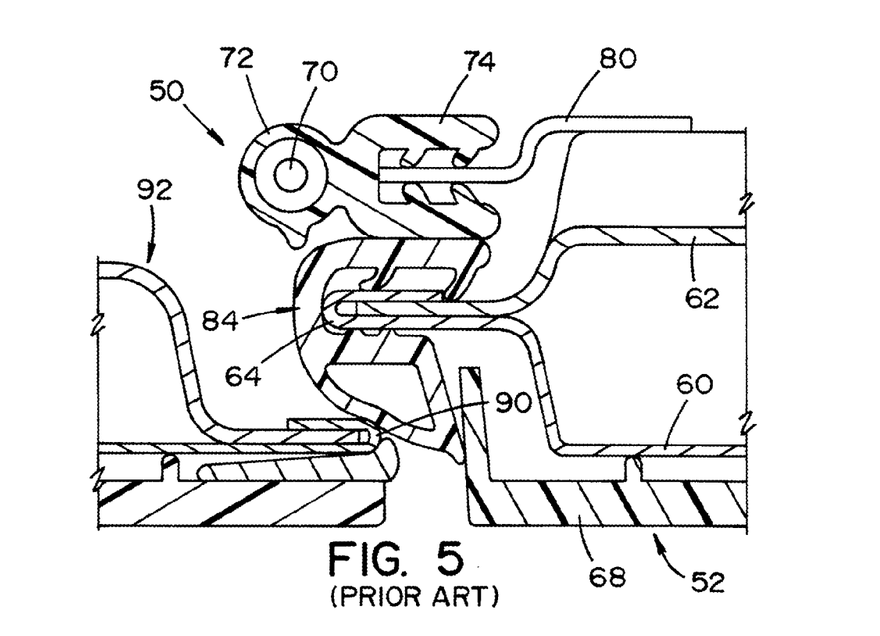
FIG. 5 is a cross-sectional view of similar to FIG. 4; however depicting a known sensor assembly and known seal member when the door is in the closed position.

FIG. 5 depicts a known pinch sensor 50 for a slide door 52. The slide door includes an outer panel 60 and an inner panel 62 connected to each other at each periphery to define a door hem 64. A garnish member 68 is connected to an upper portion of the slide door 52. Typically, the pinch sensor 50 includes a sensor main body portion 70 incorporating therein multiple conductors having gaps therebetween, a holding portion 72 having elasticity so as to hold the sensor main body portion, and an attaching portion 74 for attaching the holding portion 72 to the sliding door 52. Currently, the pinch sensor is mounted directly to a bracket 80 that is connected to the inner panel 62. The pinch sensor 50 can also be mounted directly to the door hem 64 via the attaching portion 74. A lead wire (not shown) of the pinch sensor 50 is positioned within the door 52 by passing through a through-hole formed on a side edge of the door. When the pinch sensor is secured to the bracket 80, a separate seal member 84 is connected to the door hem 64 for sealing the gap between the door outer garnish member 52 and one of a rear edge 90 of a front door 92 and a vehicle frame. In the instance where the pinch sensor 50 is secured directly to the door hem 64, the seal member 84 is integrally formed with the pinch sensor 50. In both cases, because of the location of the pinch sensor 50 relative to the garnish member 52, the pinch sensor defines a leading edge of the door 52 and, thus, can be damaged during occupant ingress/egress of the vehicle compartment.

BRIEF DESCRIPTION

In accordance with one aspect, a vehicle assembly comprises a motorized door movable between an open position and a closed position and a pressure-activated sensor assembly. The sensor assembly includes a switch component, a flexible component and an engagement component. The switch component actuates upon pressure contact with an associated obstructing object. The flexible component substantially surrounds the switch component. The engagement component is connected with the door and extends from the flexible component towards the door. An exterior garnish member is connected to the door and laterally offset from the flexible component. The garnish member is configured to at least partially inhibit contact of the flexible component by an occupant during occupant ingress and egress of the vehicle.

In accordance with another aspect, a vehicle assembly comprises a motorized door movable between an open position and a closed position. A garnish member is connected to an upper portion of the door. A frame engages the motorized door when in the closed position. A pressure-activated sensor assembly is adapted to disengage the door upon contact with an associated obstructing object. The sensor assembly includes a switch component, a flexible component and an engagement component. The switch component actuates upon pressure contact with the associated obstructing object. The switch component extends longitudinally beyond a contacting edge of the door. The flexible component is formed of an elastomeric sponge material. The engagement component engages a projection of the door. The protective member is integrally formed on an outer surface of the flexible component. The protective member is formed of a solid elastomeric material to improve wear durability of the flexible component and has a thickness less than a thickness of the flexible component. A seal member forms a sealing engagement between the door and the frame. The seal member is separate and spaced from the sensor assembly and mechanically affixed to the garnish member.

In accordance with yet another aspect, a pressure-activated sensor assembly having improved wear durability for use with a motorized vehicle door comprises a switch component, a flexible component and an engagement component. The switch component actuates upon pressure contact with the associated obstructing object. The flexible component is formed of an elastomeric sponge material. The engagement component engages one of an outer door panel and an inner door panel of the vehicle door. The engagement member is formed of a solid elastomeric material. A protective member is integrally formed on an outer surface of the flexible component. The protective member is formed of a solid elastomeric material to improve wear durability of the flexible component. The protective member has a thickness less than a thickness of the flexible component.

DETAILED DESCRIPTION

It should, of course, be understood that the description and drawings herein are merely illustrative and that various modifications and changes can be made in the structures disclosed without departing from the present disclosure. It will also be appreciated that the various identified components of the exemplary pinch sensor assembly for a vehicle door disclosed herein are merely terms of art that may vary from one manufacturer to another and should not be deemed to limit the present disclosure.

Figure 1:
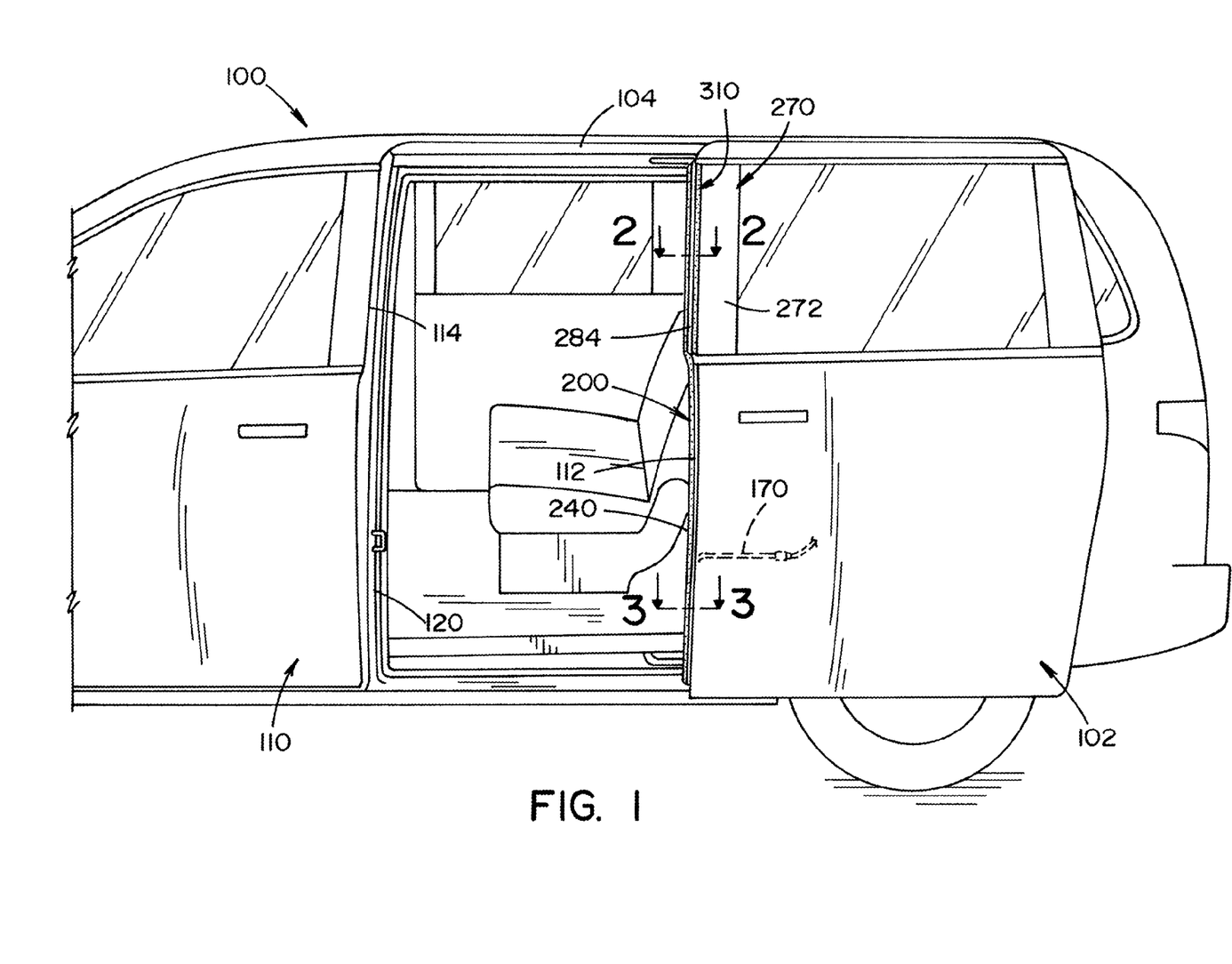
FIG. 1 schematically illustrates a vehicle assembly including a motorized door in an open position, an exemplary garnish member connected to an upper portion of the door, and a frame for engaging the motorized door when in a closed position.

Referring now to the drawings, wherein like numerals refer to like parts throughout the several views, FIG. 1 schematically illustrates a vehicle or vehicle assembly 100 comprising a motorized slide door 102 supported on a vehicle body 104 so as to be slidable in a longitudinal direction of the vehicle 100 along a lateral side of the vehicle body 104. The door 102 is movable between an open position where the door is moved toward a rearward direction of the vehicle and a closed position where the door 102 is moved from the open position in a forward direction of the vehicle to close against a frame 120 of the vehicle body 104. The door 102 is moved by a motor (not shown) in a conventional manner. A front door 110 (left front in FIG. 1) is arranged on a front side of the slide door 102 in the vehicle longitudinal direction. A front edge 112 of the slide door 102 is positioned adjacent to a rear edge 114 of the front door 110 in the door closed position.

Figure 2:
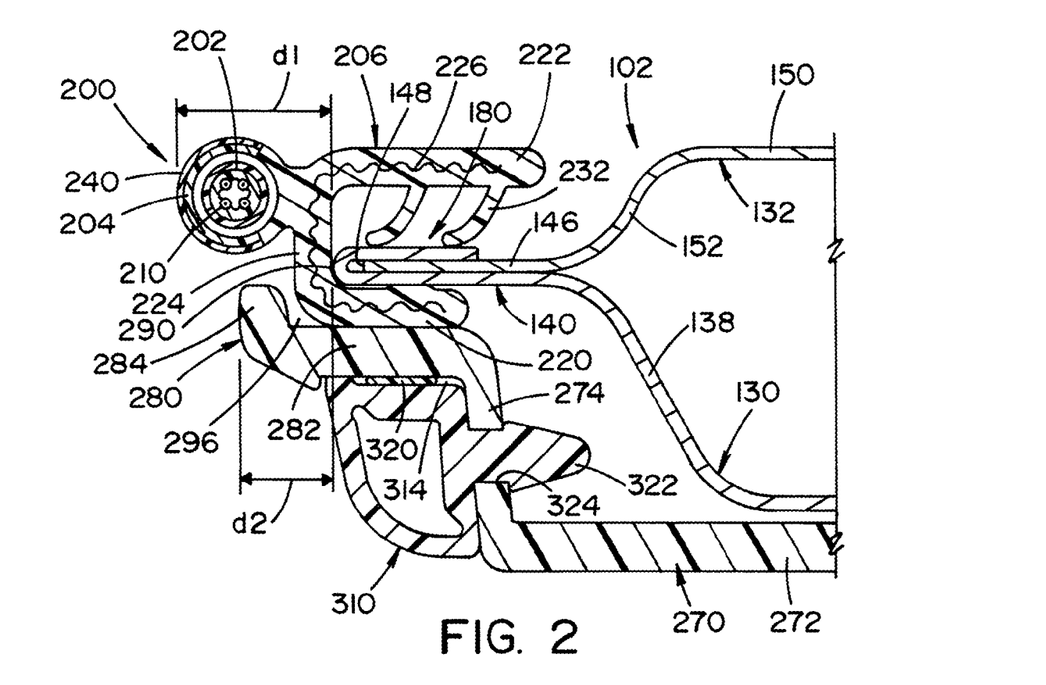
FIG. 2 is a cross-sectional view of FIG. 1 taken generally along line 2-2 of FIG. 1, the cross-section depicting an exemplary pressure-activated sensor assembly and an exemplary seal member for forming a sealing engagement between the door and the frame.
Figure 3:
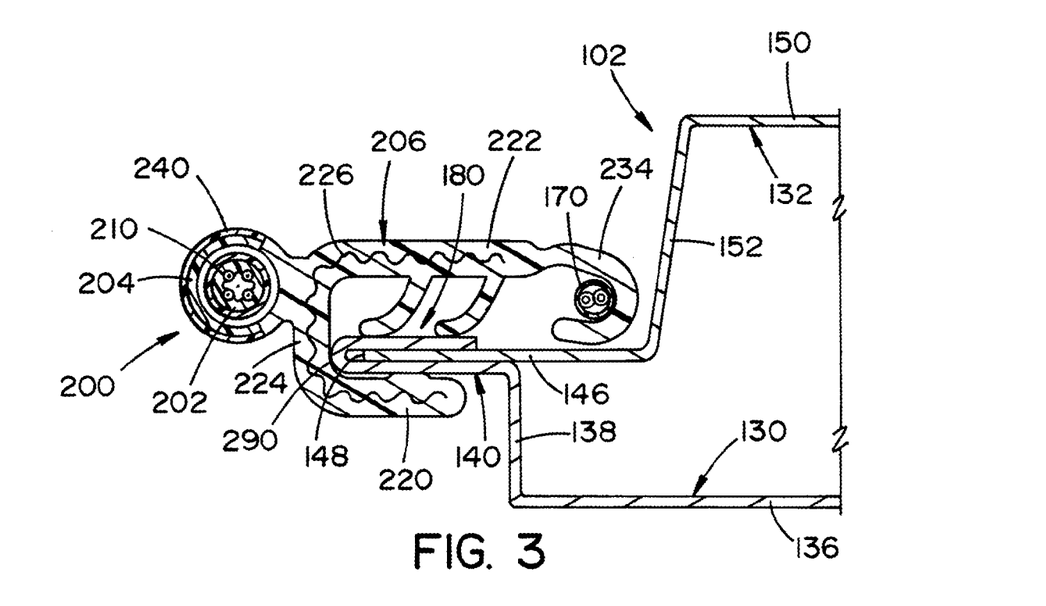
FIG. 3 is a cross-sectional view of FIG. 1 taken generally along line 3-3 of FIG.

As shown in FIGS. 2 and 3, the motorized door 102 includes by an outer door panel 130 and an inner door panel 132 connected to each other at each periphery. The outer panel 130 includes an outer portion 136 formed to fit a designed shape of the vehicle body 104, a stepped portion 138 bent towards the inner panel 132 at a front end portion of the outer portion 136, and a hemming portion 140. The hemming portion 140 extends continuously from the stepped portion 138 in the forward direction of the vehicle and then is bent so as to pinch a flange portion 146 of the inner panel 132 while overlapping an end portion 148 of the flange portion 146 of the inner panel 132. The inner panel 132 includes an inner side portion 150 constituting an inner wall of the vehicle interior, a front wall portion 152 bent towards the outer panel 130 from an outer periphery of the inner side portion 150, and the flange portion 146 (i.e., an outer peripheral portion) that extends in the forward direction of the vehicle from the front wall portion 152. A through-hole (not shown) through which a lead wire 170 (FIGS. 3 and 7) penetrates can be formed at a specified position on the front wall portion 152. The hemming portion 140 and the end portion 148 pinched by the hemming portion are referred to as a door projection or door hem 180.

Figure 7:
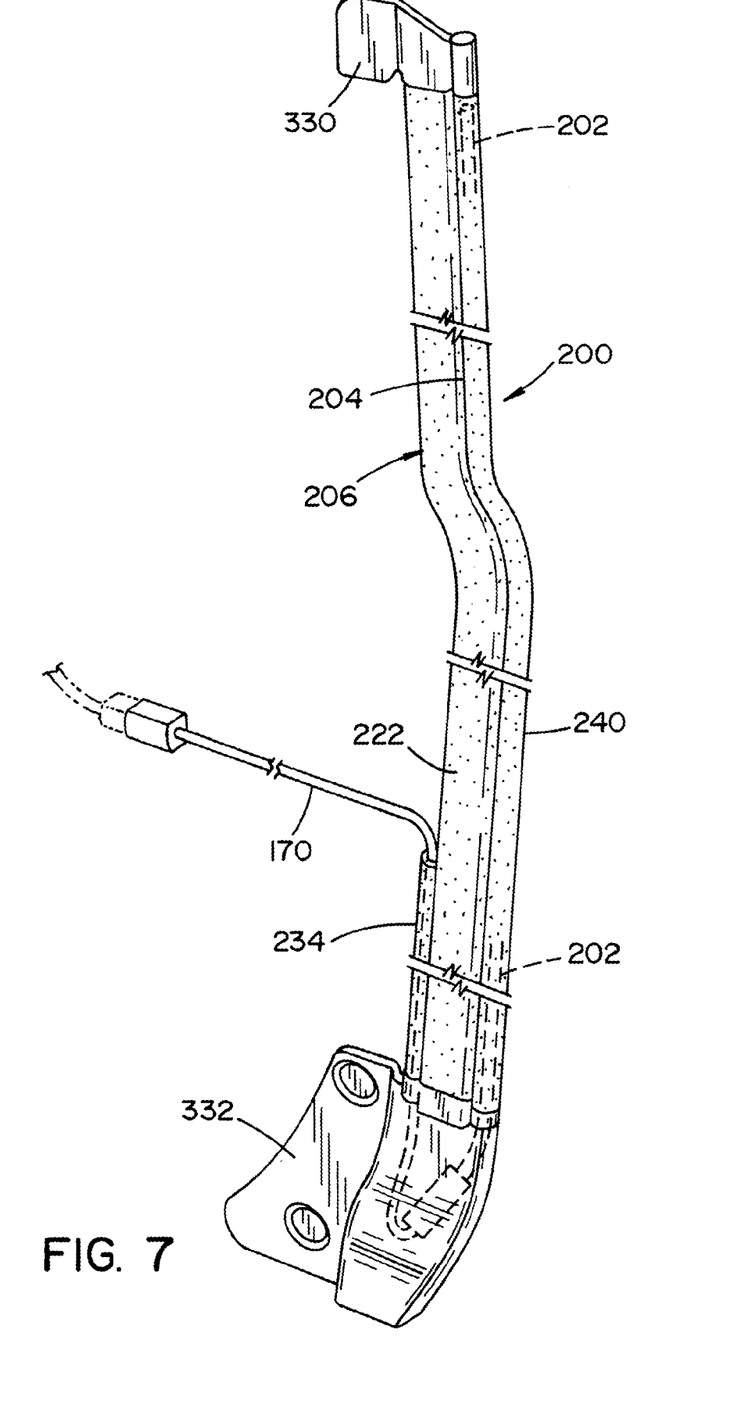
FIG. 7 is a perspective view of the seal assembly of FIG. 1.

With reference to FIGS. 2 and 3, a pressure-activated sensor assembly 200 is arranged on a front edge of the slide door 102, and as shown in FIGS. 1 and 7, and extends substantially along an overall height of the door 102. The sensor assembly 200 generally includes a switch component or sensor main body 202, a flexible component or holding portion 204 and an engagement component or attaching portion 206. The switch component 202 is adapted to actuate upon contact with an obstructing object. The switch component 202 can be a multiple-strand arrangement of wires or conductors 210 that are arranged so that contact of the switch component 202 by an obstruction (i.e., a pinch contact) causes two or more wires to come into contact with each other, thereby establishing a current in an electric circuit. Detection of this current may then be used to deactivate the motor (not shown) that drives the slide door 102, thereby stopping the motion of the slide door. In this way, the motor is deactivated upon pinch contact of the pressure-activated sensor assembly 200 by the obstruction. The switch component 202 has a height substantially equal to a height of the door 102 and extends substantially longitudinally beyond a contacting edge of the door 102. The lead wire 170 is electrically connected to the conductors 210 of the switch component 202 on a lower side thereof. It should be appreciated that alternative switch components for the sensor assembly 200 are contemplated.

The flexible component 204 substantially surrounds and encases the switch component 202. As shown in FIG. 2, the flexible component 204 protrudes from the door projection or door hem 180 of the door 102. In this way, the sensor switch component 202 is disposed so as to efficiently engage an obstruction and thereby promote safety. According to one aspect, the flexible component 204 is formed of an elastomeric sponge-like material having a predetermined hardness and specific gravity or density. For example, the flexible component 204 can be a sponge rubber that is soft and easily deformable, and having a specific gravity between 0.50 and 0.80. The flexible component 204 has an elongated hollow cylinder shape and has a height substantially equal to that of the slide door 102.

Figure 6:
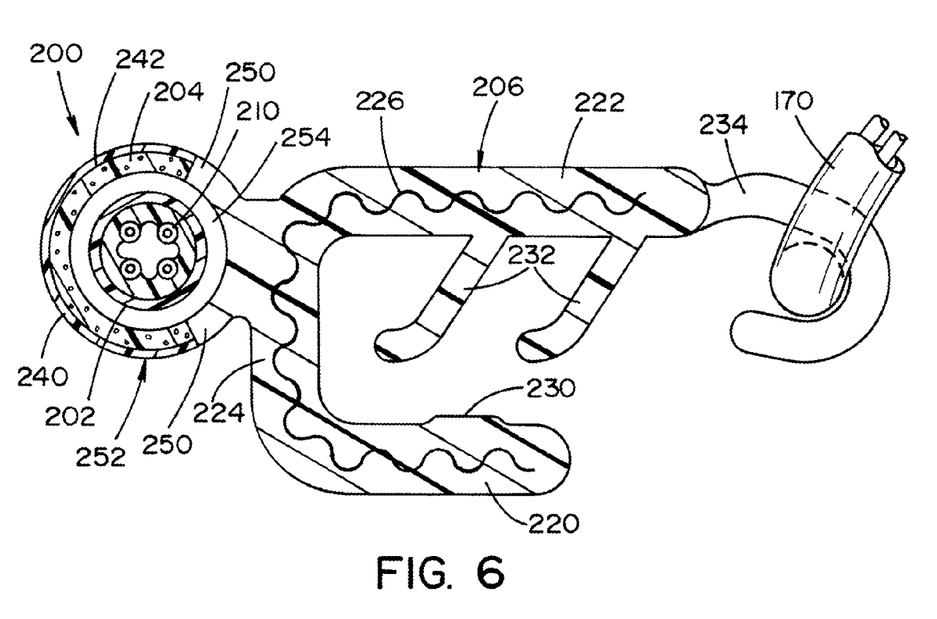
FIG. 6 is an enlarged cross-section view of the seal assembly of FIG. 1.

With continued reference to FIGS. 2 and 3, the engagement component 206 is connected with the door 102 and extends in a vehicle rearward direction from the flexible component 204 towards the door. The engagement component 206 can be, in one embodiment, generally U-shaped in cross-section having a pair of legs 220,222 connected to a base 224 and that are positioned on opposite sides of the projection 180, as shown. The engagement component 206 can include a metal core 226 to resist deformation and to hold the pressure activated sensor assembly 200 more securely to the projection 180. The engagement component 206 can also include at least one deformable member extending inwardly from at least one of the legs 220,222. As best illustrated in FIG. 6, leg 220 includes a tab 230 and leg 222 includes fingers 232 extending in a vehicle forward direction towards the leg 220. The tab 230 together with the fingers 232 forms an interference engagement with the projection 180 of the slide door 102. The engagement component 206 is formed of a solid elastomeric material having a predetermined first hardness or density. For example, the engagement member can be formed of a sold rubber having shore hardness between 65 and 75.

A cover portion 234 extends from the leg 222 of the engagement portion 206 in a vehicle rearward direction further from the leg 222 so as to cover and at least partially hold the lead wire 170. The cover portion 234 is generally C-shaped in cross-section and can be integrally formed with the engagement component 206, without providing another part, thereby providing a safe structure for routing lead wire 170.

As shown in FIG. 6, a protective member 240 is secured to and substantially surrounds an outer surface 242 of the flexible component 204. The protective member defines a dense outer skin of the flexible component to improve wear durability of the sensor assembly 200, particularly the flexible component 204. The protective member 240 is formed of a solid elastomeric material having predetermined thickness and a predetermined second hardness or density. The thickness of the protective member 240 is less than a thickness of the flexible component 204, and according to one aspect, is about one-half the thickness of the flexible component. The density of the protective member 240 is greater than the density of the flexible component 204, and the second shore hardness of the protective member 240 is less than the first shore hardness of the engagement component 206. For example, the engagement component 206 can be formed of a solid rubber having shore hardness between 50 and 60. The flexible component 204, engagement component 206, and protective member 240 are all formed integrally as a single component using a molding or extrusion process, as is known in the art.

In addition, the protective member 240, flexible component 204 and a portion 250 of the engagement member 206 together define an enclosure 252 having a channel or opening 254 for housing the switch component 202 therein. According to one aspect, the enclosure 250 has a substantially constant thickness and the opening 254 has substantially constant diameter. For example, the enclosure 252 can have a thickness of approximately 1.0 cm and the opening 254 can have a diameter of approximately 5.0 cm. With this exemplary embodiment, the portion 250 of the engagement member 206 has a thickness of approximately 1.0 cm, the protective member 240 has a thickness of approximately 0.3 mm and the flexible component 204 has a thickness of approximately 0.7 cm.

With reference now to FIGS. 1 and 2, an exemplary garnish member 270 is connected to an upper portion of the door 102 and is laterally offset from the flexible component 204. The garnish member 270 is configured to at least partially inhibit contact of the flexible component 204 by an occupant of the vehicle during occupant ingress and egress of the vehicle. Particularly, the garnish member 270 includes a side portion 272 constituting an exterior part of the slide door 102, a front wall portion 274 bent towards the outer panel 130 from an outer periphery of the side portion 272, and an extended portion 280 that extends in the forward direction of the vehicle from the front wall portion 274. The extended portion 280 at least partially defines an upper leading edge of the door 102, and is positioned adjacent the flexible component 204 to reduce exposure to the flexible component. The extended portion 280 is generally L-shaped in cross-section and includes a first section 282 and a second section 284. The first section 282 extends substantially parallel to and past a distal end 290 of the door hem 180. The second section 284 projects laterally toward the flexible component 204 and is spaced from and extends substantially parallel to the base 224 of the engagement component 206. As best depicted in FIG. 2, the exemplary sensor assembly 200 extends a first dimension (d1) outwardly from the distal end 290 of the door hem 180 and the extended portion 280 of the garnish member 270 extends a second dimension (d2) outwardly from the distal end of the door hem. The second dimension is less (only slightly less) than the first dimension to reduce exposure to the flexible component 204 by the occupant. According to one aspect, this reduced exposure, i.e., the difference between d1 and d2, is about 3.6 mm.

Figure 4:
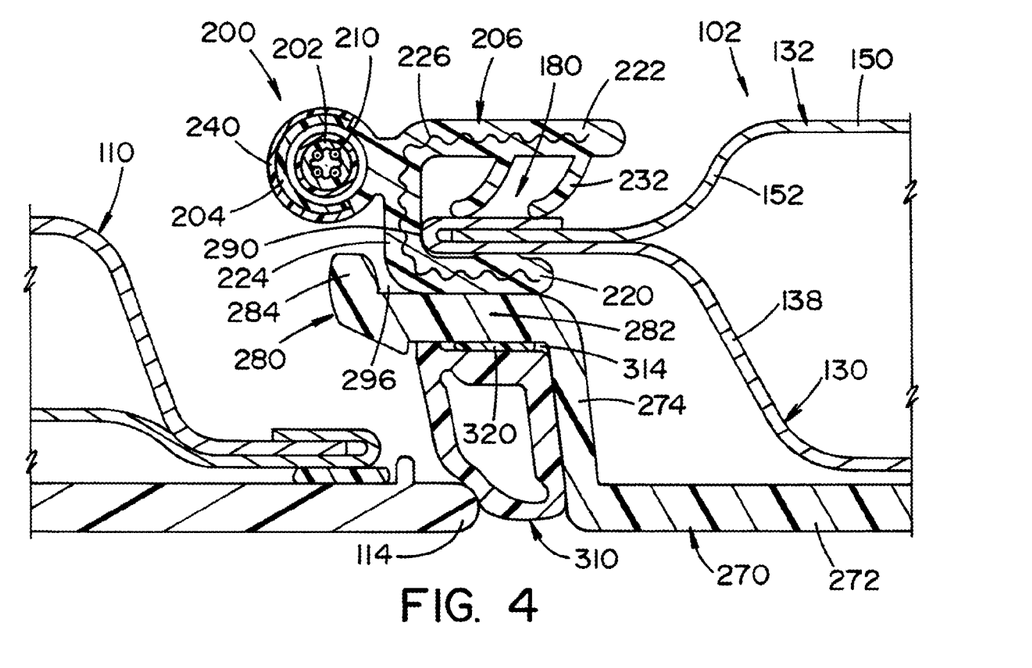
FIG. 4 is a cross-sectional view depicting the exemplary sensor assembly and exemplary seal member of FIG. 1 when the door is in the closed position.

With reference again to FIGS. 2 and 4, the extended portion 280 also contacts the engagement component 206 to at least partially secure the engagement component to the door hem 180. A portion of the engagement component is sandwiched between the extended portion 280 and the door hem 180. Particularly, the first section 282 is laterally spaced from the door hem 180 such that the door hem 180 and the first section 282 define a channel 296. The channel 296 is sized to frictionally receive the leg 220 of the engagement component 206, whereby the tab 230 (FIG. 6) provided on the leg 220 engages the door hem 180. Once positioned in the channel 296, the leg 220 is secured between the door hem 180 and the first section 282 of the garnish member extended portion 280.

The vehicle assembly 100 further includes a separate seal member 310 for forming a sealing engagement between the door 102 and one of the rear edge 114 of the front door 110 and the vehicle frame 120 and for reducing wind noise and preventing moisture ingress. The seal member 310 is laterally spaced from the sensor assembly 200 and mechanically affixed to the garnish member extended portion 280. To properly position the seal member 310 on the garnish member 270, the front wall portion 274 together with the first section 282 of the extended portion 180 define a channel 314 dimensioned to receive at least a portion of the seal member. The seal member 310 can be affixed to the first section 282 via an adhesive 320. The seal member 310 can also be affixed to the front wall portion 274 via an attachment member 322. As depicted, the attachment member 322 is a fastener which extends through an opening 324 located on the front wall portion 274. The attachment member 322 can be integrally formed with the seal member 310 thereby eliminating the need for separate brackets or other known attachment devices.

As is evident from the foregoing, the present disclosure is directed to the vehicle assembly 100 which has improved wear durability for the sensor assembly 200 and provides protection for the sensor assembly as an occupant exits the vehicle compartment. The protective member or dense skin 240 is provided at least partially around the flexible component 204 to protect the sensor assembly 200 during occupant ingress/egress. The garnish member 270 is at least partially extended to protect the sensor assembly. By providing a rigid resistance to the leading edge of the slide door 102, an occupant is more likely to avoid contact with the flexible component 204 upon entry. The extended section 280 of the garnish member 270 also provides a mounting surface for the separate seal member 310 between the garnish member and the vehicle body 104. The sensor assembly 200 further includes an upper attachment member 330 and a lower attachment member 332. As depicted in FIG. 7, the upper and lower attachment members 330, 332 connect the sensor assembly 200 to respective upper and lower portions of the door 102 (FIG. 1). This layout provides improved robustness for retention of the sensor assembly 200 and provides a cleaner fit and finish with the garnish member and separate seal member.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle assembly comprising:
    a motorized door movable between an open position and a closed position;
    a pressure-activated sensor assembly including:
        a switch component that actuates upon pressure contact with an associated obstructing object;
        a flexible component that substantially surrounds the switch component; and
        an engagement component connected with the door and extending from the flexible component towards the door; and
    an exterior garnish member separate from both the sensor assembly and door and directly connected to the door and laterally offset from the flexible component, the garnish member being configured to at least partially secure the sensor assembly to the door and at least partially inhibit contact of the flexible component by an occupant during occupant ingress and egress of the vehicle.

2. The vehicle assembly of claim 1, further including a protective member secured to and substantially surrounding an outer surface of the flexible component, the protective member having a density greater than a density of the flexible component to improve wear durability of the flexible component.

3. The vehicle assembly of claim 2, wherein the protective member is formed of a solid elastomeric material and the flexible component is formed of an elastomeric sponge material.

4. The vehicle assembly of claim 1, wherein the garnish member includes an extended portion, the extended portion at least partially defining an upper leading edge of the door, the extended portion being positioned adjacent the flexible component to reduce exposure to the flexible component.

5. The vehicle assembly of claim 4, wherein the door includes an outer door panel and an inner door panel, respective end portions of the outer door panel and inner door panel being connected to define a door hem, the garnish member extended portion including a first section that extends substantially parallel to a door hem and a second section that projects toward the flexible component.

6. The vehicle assembly of claim 5, wherein the sensor assembly extends a first dimension outwardly from a distal end of the door hem and the garnish member extended portion extends a second dimension outwardly from the distal end of the door hem which is less than the first dimension to reduce exposure to the flexible component to about 3.6 mm.

7. The vehicle assembly of claim 4, wherein the garnish member extended portion contacts the engagement component to at least partially secure the engagement component to the door hem.

8. The vehicle assembly of claim 7, wherein the engagement component is U-shaped and includes a first leg and a second leg, the engagement component further including at least one deformable member provided on the first leg and extending toward the second leg, the at least one deformable member together with the second leg forming an interference engagement with the door hem, the second leg being secured between the door hem and the garnish member extended portion.

9. The vehicle assembly of claim 4, further includes a seal member for forming a sealing engagement between the door and a vehicle frame, the seal member being separate and spaced from the sensor assembly and separate from and mechanically affixed to the garnish member extended portion.

10. The vehicle assembly of claim 9, wherein the garnish member extended portion defines a channel dimensioned to receive at least a portion of the seal member.

11. The vehicle assembly of claim 1, wherein the sensor assembly includes an upper attachment member and a lower attachment member, the upper and lower attachment members connecting the sensor assembly to respective upper and lower portions of the door.

12. A vehicle assembly comprising:
a motorized door movable between an open position and a closed position;
a garnish member connected to an upper portion of the door
a frame that engages the motorized door when in the closed position;
a pressure-activated sensor assembly separate from the garnish member and adapted to disengage the door upon contact with an associated obstructing object, the pressure-activated sensor assembly including:
a switch component that actuates upon pressure contact with the associated obstructing object, the switch component extending longitudinally beyond a contacting edge of the door;
a flexible component formed of an elastomeric sponge material;
an engagement component that engages a projection of the door; and
a protective member integrally formed on an outer surface of the flexible component, the protective member being formed of a solid elastomeric material to improve wear durability of the flexible component and has a thickness less than a thickness of the flexible component; and
a seal member for forming a sealing engagement between the door and the frame, the seal member being separate and spaced from the sensor assembly and separate from and mechanically affixed to the garnish member,
wherein the garnish member includes an extended portion, the extended portion at least partially defining an upper leading edge of the door to reduce exposure to the flexible component, the extended portion at least partially securing the sensor assembly to the door projection.

13. The vehicle assembly of claim 12, wherein a portion of the engagement component is integrally formed with the flexible component and the protective member, the engagement component portion together with the flexible component and protective member define an enclosure for the switch component, the enclosure having a substantially constant thickness.

14. The vehicle assembly of claim 12, wherein a portion of the engagement component is sandwiched between the garnish member extended portion and the door projection.

15. The vehicle assembly of claim 12, wherein the garnish member extended portion is generally L-shaped and extends outwardly past a distal end of the door projection, a section of the extended member projecting toward an interior of the door.

16. The vehicle assembly of claim 12, wherein the seal member is mechanically affixed to the garnish member extended portion.

17. A vehicle assembly comprising:
a motorized door movable between an open position and a closed position;
a pressure-activated sensor assembly having improved wear durability for use with the motorized vehicle door, the pressure-activated sensor assembly comprising:
a switch component that actuates upon pressure contact with an associated obstructing object;
a flexible component formed of an elastomeric sponge material;
an engagement component that engages one of an outer door panel and an inner door panel of the vehicle door, the engagement member being formed of a solid elastomeric material; and
a protective member integrally formed on an outer surface of the flexible component and at least partially defining an exposed surface of the sensor assembly, the protective member being formed of a solid elastomeric material to improve wear durability of the flexible component, the protective member having a thickness less than a thickness of the flexible component;
a garnish member connected to the door; and
a seal member connected to the garnish member, the garnish member positioned between the sensor assembly and the seal member to separate the seal member from the sensor assembly.

18. The vehicle assembly of claim 17, wherein the garnish member has an extended portion, the extended portion projecting outwardly past a distal end of a door hem to reduce exposure to the flexible component, a portion of the engagement component being secured between the extended portion of the door hem.

19. The vehicle assembly of claim 18, wherein the seal member is separate from and mechanically affixed to the extended portion.

* * * * *